(12) United States Patent
Clapper

(10) Patent No.: US 6,859,908 B1
(45) Date of Patent: Feb. 22, 2005

(54) AUTOMATED TEXT ENTRY FOR PROCESSOR-BASED SYSTEM

(75) Inventor: Edward O. Clapper, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 535 days.

(21) Appl. No.: 09/387,350

(22) Filed: Aug. 31, 1999

(51) Int. Cl.[7] ............................................. G06F 17/00
(52) U.S. Cl. ...................................... 715/507; 715/531
(58) Field of Search ............................... 707/507, 506, 707/508; 345/780

(56) References Cited

U.S. PATENT DOCUMENTS

| | | | | |
|---|---|---|---|---|
| 5,794,259 A | * | 8/1998 | Kikinis | 345/810 |
| 6,192,380 B1 | * | 2/2001 | Light et al. | 707/10 |
| 6,377,965 B1 | * | 4/2002 | Hachamovitch et al. | 707/530 |

OTHER PUBLICATIONS

Microsoft Internet Explorer 5, as disclosed in Black, Gordon: Getting it completed—automatically. Microsoft Corp., www.microsoft.com/windows98/usingwindows/work/articles/903Mar/Autocomplete.asp, May 19, 1999.*

Microsoft Internet Explorer 5, as disclosed in Windows–Help.NET: AutoComplete for Passwords & Forms. www.windows–help.net/windows98/ie50–80.htm, Mar. 29, 1999.*

Microsoft Internet Explorer 4, as disclosed in Ross, John: ABCs of Microsoft Internet Explorer 4, Sybex, 1997 as listed on www.books24x7.com.*

Lee Services, QuikDict Spelling Dictionary version 1.3, 1997.* www.dell.com from Oct. 7, 1997 as accessed through Internet Archive, Way Back Machine, www.archive.org.*

Moseley, Lonnie and Boodey, David, Mastering Microsoft Office 97: Professional Edition Second Edition; Sybex 1997 pp. 151–153.*

* cited by examiner

*Primary Examiner*—Sanjiv Shah
(74) *Attorney, Agent, or Firm*—Trop, Pruner & Hu, P.C.

(57) ABSTRACT

Predefined text may be repetitively entered into graphical user interfaces in response to mouse commands. This enables systems with reduced keyboard functions to more easily insert the text data. In addition, in systems with conventional keyboards, the user can automate the entry of common text.

20 Claims, 7 Drawing Sheets

AUTOMATED TEXT ENTRY FOR PROCESSOR-BASED SYSTEM

BACKGROUND

This invention relates generally to input/output techniques for processor-based systems and particularly to techniques for entering text into graphical user interfaces.

Processor-based systems are becoming increasingly smaller and more portable. For example cellular phones now have many capabilities formerly only available with full scale personal computers. Similarly, battery-operated handheld processor-based systems such as a personal digital assistants (PDAs) also have., advanced computer functionalities. Both telephones and PDAs are now available which provide cellular links to the Internet, and advanced scheduling capabilities, all of which involve, to varying degrees, the entry of text into graphical user interfaces.

Similarly, there is increasing acceptance of set top computers. These computers provide computer functionalities generally using a television receiver as their display. Commonly, they are positioned on top of the television receiver housing and are coupled thereto for operation under control by a remote control unit (RCU). Conventionally, the RCU implements mouse-like control of graphical user interfaces displayed on the television receiver. A full scale keyboard may not provided. One usage model of the set top computer is to operate the computer much like a television receiver is conventionally operated—using a remote control rather than a keyboard. Thus, set top computers may provide advanced computer functionality as well as to access the Internet.

In the course of accessing Internet web sites, it is commonly necessary to input information into graphical user interfaces. In a variety of Internet applications it is desirable to input common text information. To buy items over the Internet, conventionally information is required such as the user's name, address, and information about the items being purchased as well as credit card information. The user normally repetitively enters the information over and over with each transaction.

While these repetitive tasks may be unnecessarily time consuming in connection with processor-based systems which have full scale keyboards, in systems with reduced keyboards or no keyboards, they become extremely onerous. For example, in connection with some set top computers and the PalmPilot PDA, the user may input text information by mouse clicking on the "keys" of a graphical user interface in the form of a keyboard. Of course, moving the cursor to align with each graphical key and operating the "key" tends to be time consuming and to require, in many cases, considerable manual dexterity. Similarly, with set top computer systems operated through RCUs, text entry tends to be challenging.

Thus, there is a continuing need for better ways to enter text in connection with processor-based systems.

SUMMARY

In accordance with one aspect, a method of providing code for text entry fields in Internet web pages includes identifying a mouse event and determining whether the mouse event is associated with a text entry field. A set of text entry options are displayed. The code corresponding to a selected option is copied into the text entry field.

Other aspects are set forth in the accompanying detailed description and claims.

DETAILED DESCRIPTION

Figure 1:
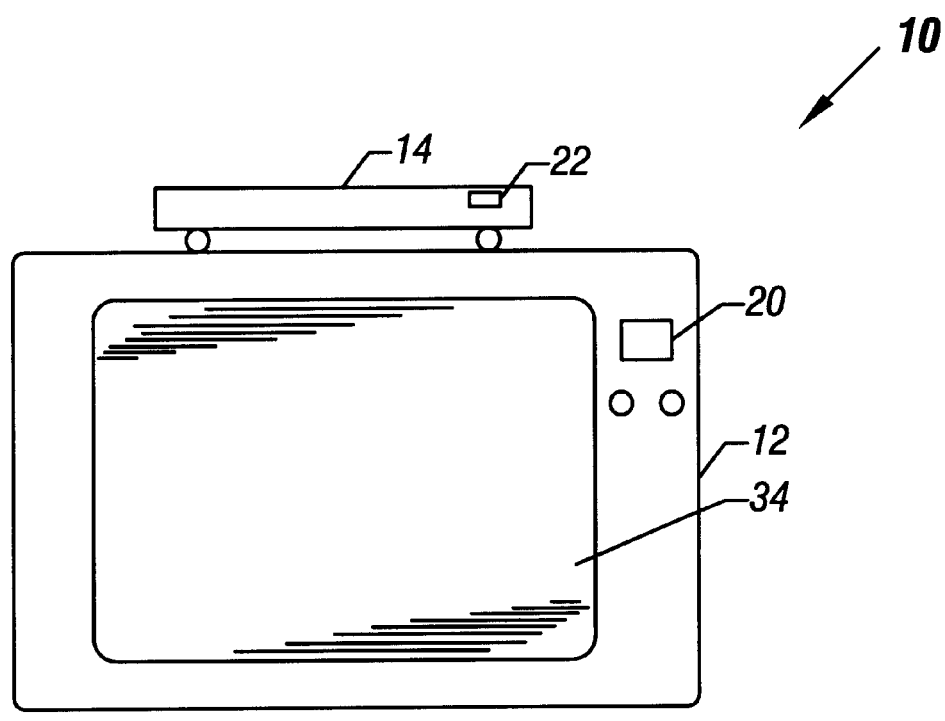
FIG. 1 is a front elevational view of one embodiment of the present invention.
Figure 1:
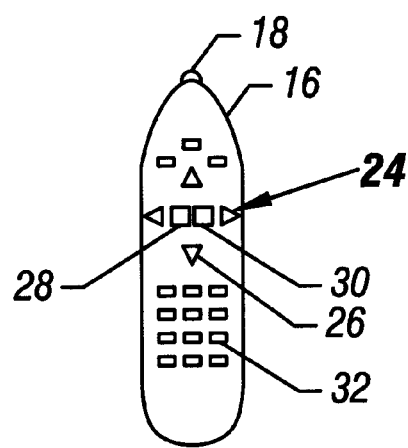

A processor-based system 10 shown in FIG. 1, includes a television receiver 12, a processor-based unit 14 and a remote control unit (RCU) 16. The remote control unit 16 enables the user to remotely control, using infrared signals for example, the processor-based unit 14 and the receiver 12. For example, the RCU 16 may have an infrared transceiver 18 which communicates with transceivers 20 and 22 on the receiver 12 and the unit 14 respectively.

The user can make mouse selections using the RCU 16. The term "mouse" as used herein is not limited to the conventional external device connected to desktop computer systems but rather extends to any device which enables user interaction with a graphical user interface through control of a cursor or through control of highlighting of selected items on a graphical user interface.

Thus, the RCU 16 includes a left mouse button 28 and a right mouse button 30 and a plurality of direction controls 26 within a compact control area 24. In this way, the user can manipulate the position of a cursor using the controls 26 and may select items displayed on the display screen 34 in association with that cursor. Alternatively, as is well known, the controls 26 may be used to highlight potentially selectable options displayed on the display screen 34. These options may then be selected using the left mouse button 28.

The remote control unit 16 may also include a plurality of other controls including a numerical keypad 32 to facilitate channel selection and for numerical inputs. While the RCU 16 has been illustrated as being an infrared based system, other systems may be used as well, including those that make use of radio frequency or ultrasonic signals and those that are cable based.

In addition, while the present invention has been described with respect to a set top computer system, the present invention is also applicable to any processor based system including those which have reduced keyboard functionalities such as cellular telephones, PDAs, processor-based appliances and the like. In addition, the present invention is applicable as well to personal computer systems such as desktop and laptop computer systems.

Figure 2:
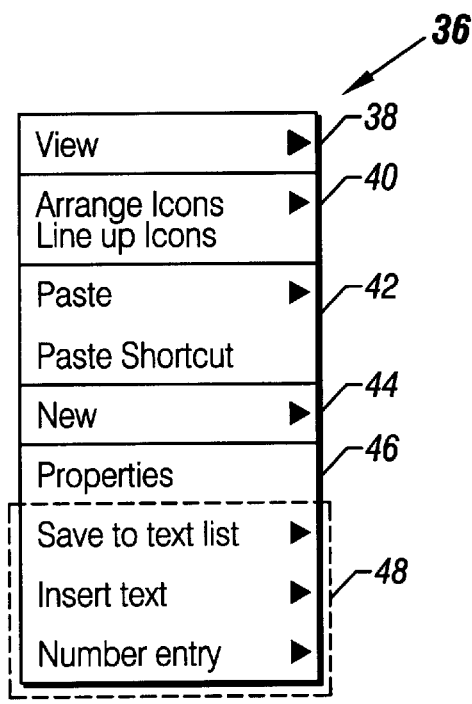
FIG. 2 shows a graphical user interface in accordance with one embodiment of the present invention.

The right mouse button 30 may used to select a graphical user interface 36, shown in FIG. 2. The graphical user interface 36 is responsible for facilitating the entry of text into graphical user interfaces associated with computer applications such as those presented by Internet web pages. Thus, based on the position of a cursor or highlighting, upon selecting the right mouse button, the graphical user interface 36 appears proximate to the highlighting or cursor.

The graphical user interface 36 includes a view icon 38, an icon 40 for arranging icons, a paste icon 42, a new icon 44, a properties icon 46 and a text entry icon 48 which includes the entries "save to text list", "insert text", and "number entry". Each of the icons may be selected using the mouse operation. Namely, by positioning a cursor or highlighting on the desired icon, using the controls 26, and operating the left mouse button 28, a particular icon 38 through 48 may be selected. Alternatively, drop down on pop-up menus may expand automatically as is well known.

Figure 3:
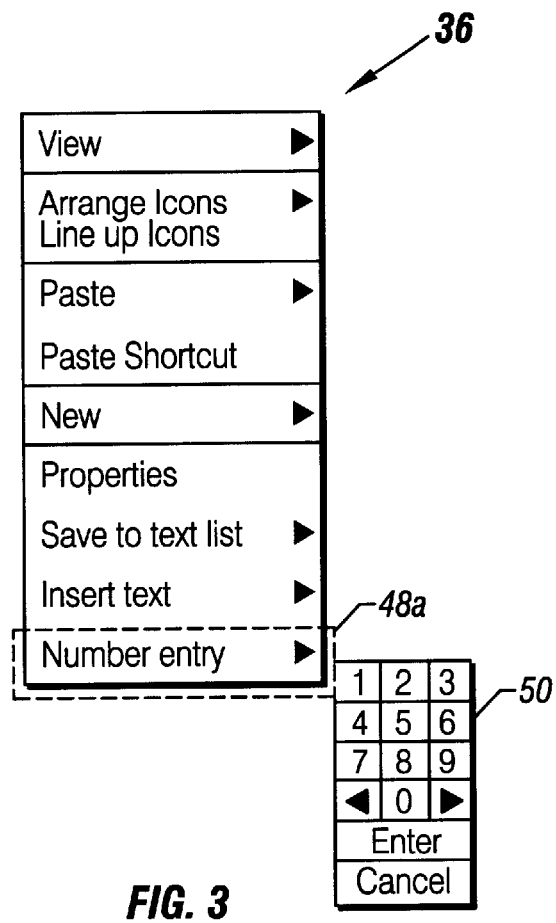
FIG. 3 shows an expanded form of the graphical user interface shown in FIG. 2.

Referring to FIG. 3, when the "number entry" icon 48a in the text entry icon 48 is selected, a numerical "keyboard" 50 of the type commonly found on telephones is presented. This allows the user to mouse click to select any of the numbers for making numerical entries into graphical user interfaces.

Figure 4:
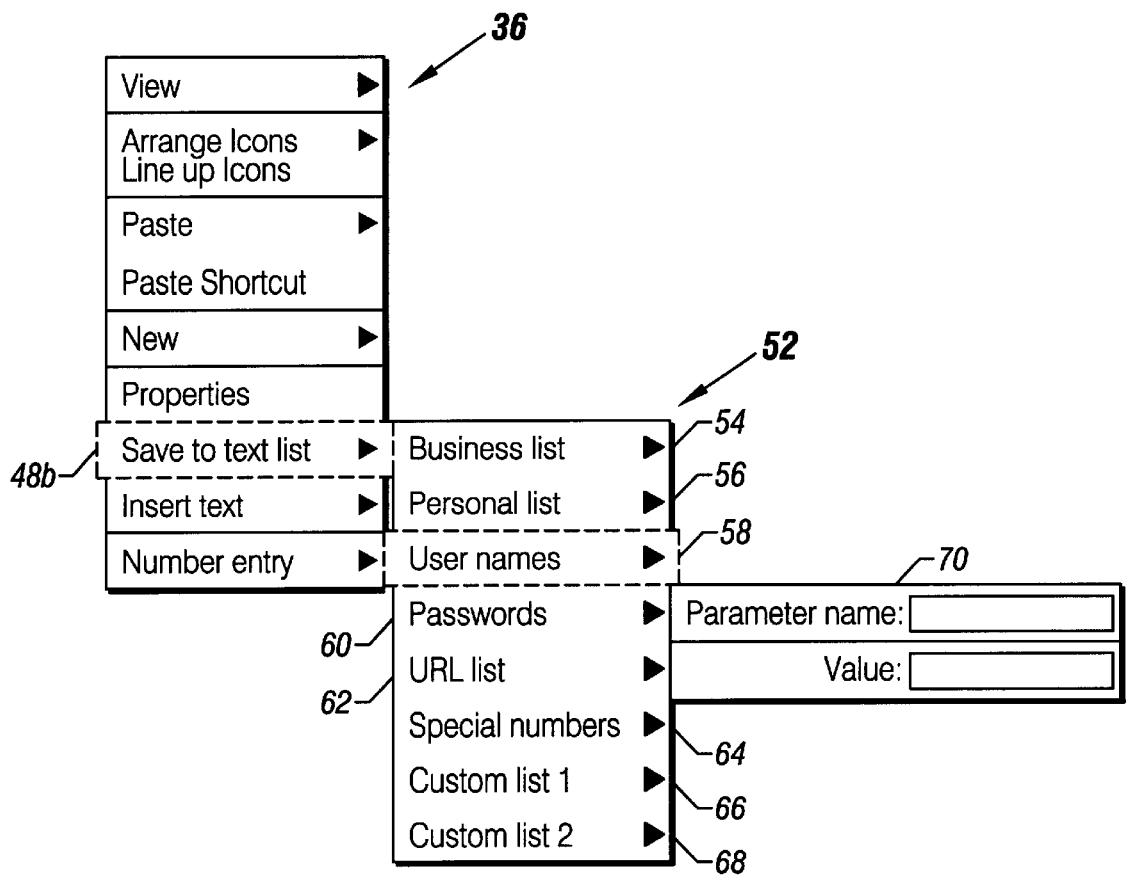
FIG. 4 shows a still further expanded form of the graphical user interface shown in FIG. 2.

Referring next to FIG. 4, the graphical user interface 36 has been expanded by selecting the icon 48b, titled "save to text line", which causes a drop down menu 52 to appear in association with the graphical user interface 36. The drop down menu 32 includes the icon 54 for a business list, the icon 56 for a personal list, the icon 58 for user names, the icon 60 for passwords, the icon 62 for a Universal Resource Locator (URL), the icon 64 for special numbers., and the icons 66 and 68 for custom lists.

As illustrated, when the user selects the icon 58, a drop down menu 70 appears which provides text entry fields for a parameter name and value. This allows the user to enter well known user names for accessing different Internet web sites.

Thus, each of the entries in the drop down menu 52 enable storage of desired text entry information. For example, the business list icon 54 may accept information related to the user's business address telephone number, fax number and e-mail address as well as his or her name and company name. The personal list icon 56 may accept the same kind of information about the user's home address. The passwords icon 60 may accept for storage a number of different passwords which are used in different situations, so that these passwords may be automatically entered by generating mouse events. Similarly, a URL list icon 62 simply lists universal resource locators which may be entered for subsequent mouse selection. The icon 64 enables entry of pre-entered numerical sequences such as credit card numbers, passwords, telephone numbers and the like.

The icons 66 and 68 provide for other information which may be repetitively entered into graphical user interfaces by a particular user. In other words, the user can program the information which the user wishes to have for mouse selection.

Figure 5:
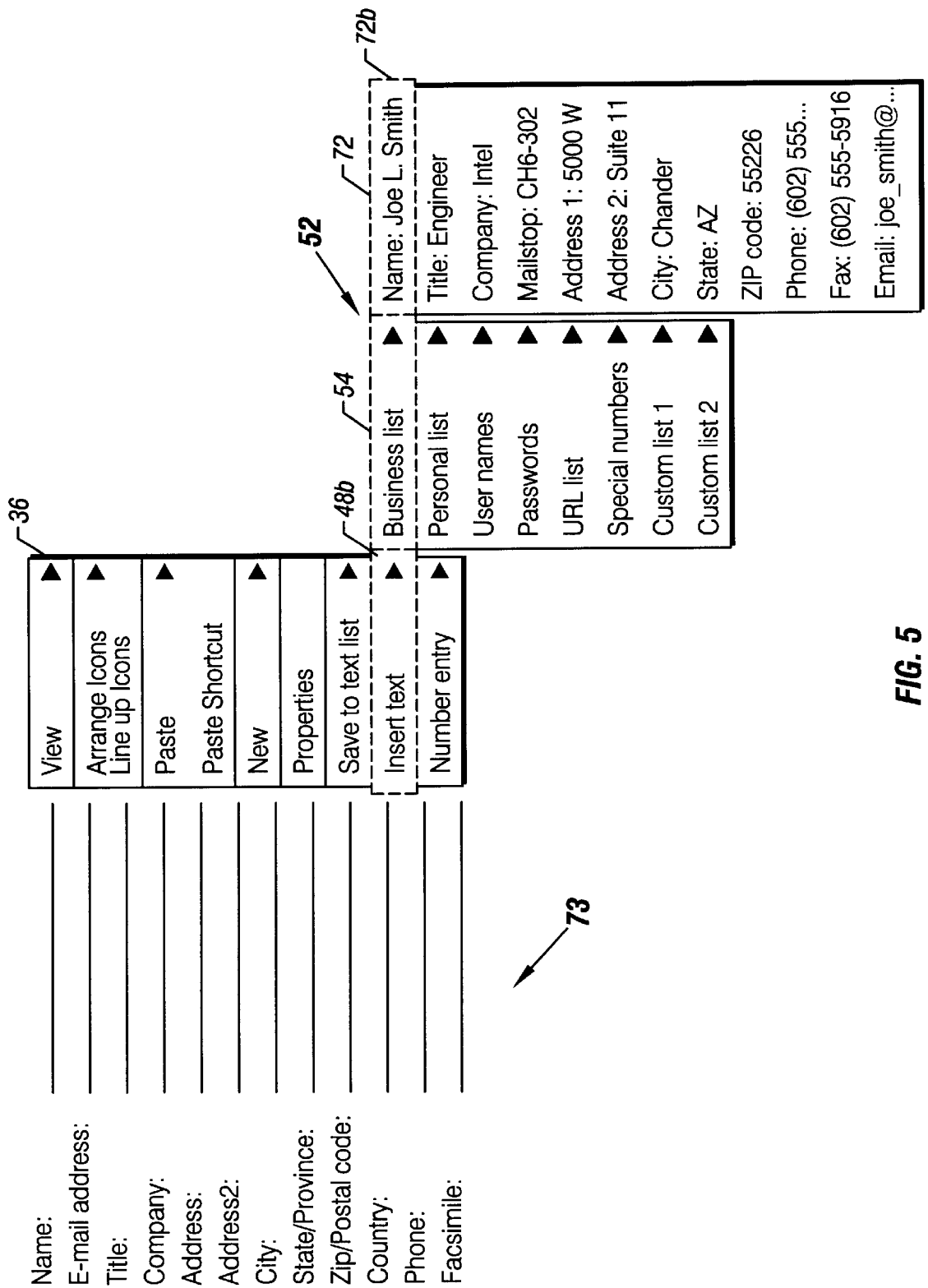
FIG. 5 shows an Internet web page and the application of the graphical user interface shown in FIG. 2 to entering text into text entry fields in the web page.

An example of the application of the software for automated text entry, shown in. FIG. 5, involves a typical text entry graphical user interface 73 normally found in association with web sites. For example, when the user wishes to receive more information or buy a product the user may be called upon to enter text into a text entry field. Commonly, the text entry fields may be established by software objects such as JAVA or ACTIVEX objects which facilitate the collection of information and its transmittal to a remote server for response.

In order to avoid simply typing the information in, the user can click on the right mouse button 30 at the name blank causing the graphical user interface 36 to appear. In this example, the user selects the insert text icon 48b and business list icon 54. The user then simply clicks on the requested information, such as the region 72b in the user's business list information field 72. This automatically causes the user's name to be inserted into the field. Obviously, the user can proceed through each of the requested items in the graphical user interface 36 providing information from the user's business list 73. Thus, the user can use simple mouse operations to enter text without necessitating an elaborate keyboard sequence. This facilitates text entry not only in connection with conventional computer systems but particularly in connection with systems which have either no keyboard or limited keyboard functions.

Figure 6:
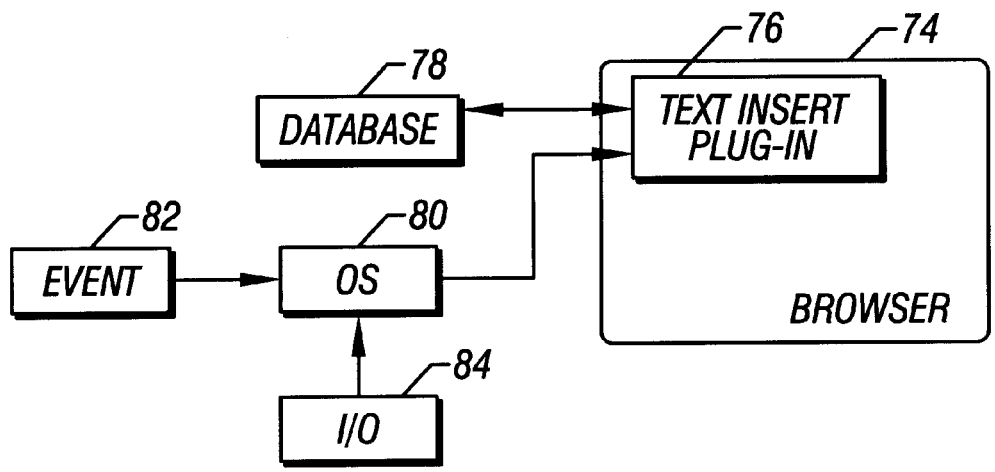
FIG. 6 is a schematic depiction of one embodiment for software for implementing the present invention.

In accordance with one embodiment of the present invention, shown in, FIG. 6, software for implementing the automatic text entry may be provided as a text insertion plug-in 76 which may be plugged into a conventional browser application program 74. Typical browser application programs include Eudora, Internet Explorer and Netscape.

After the plug-in has been inserted, the browser 74 may interact with a database 78 which includes the text entry information which has been preprogrammed by the user. In addition, the browser 74 may operate with the operating system 80 to receive information about mouse events, as indicated at block 82. A mouse event is basically the user's operation of a left or right mouse button indicating that the user wishes to select an icon. In addition, input/output selections may be provided, as indicated at 84, through the operating system 80 to the plug-in 76 contained within the browser 74. In this way, the plug-in and the browser receive the interfaces that are needed to implement the automated text entry function.

Conveniently, the plug-in may be implemented through object oriented programming languages such as JAVA, ACTIVEX or C++. In this way, different plug-ins may be provided to work with different browsers and different operating systems as necessary.

Figure 7:
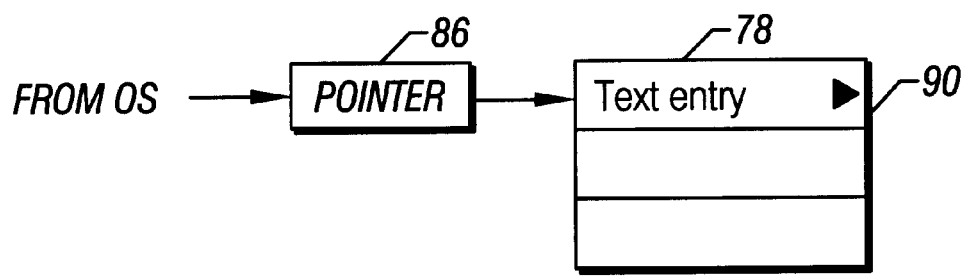
FIG. 7 is a schematic depiction of the interaction between the operating system and a text entry memory array in accordance with one embodiment of the present invention.

Referring next to FIG. 7, information from the operating system may interact with the database 78 which stores the text entry fields 90. When the user makes a selection, this selection may be translated into a reference to the appropriate information which is stored in a memory array in the database 78. One convenient way to implement the selection of the appropriate fields within the memory array is to have the operating system provide the correct stored text locator or pointer 86 to the selected field. In this way, the operating system may use a table stored in a separate memory area to correlate a given selection by the user into a pointer to a particular entry in the database. This facilitates the selection of the desired information because it reduces translations within the plug-in software.

Figure 8:
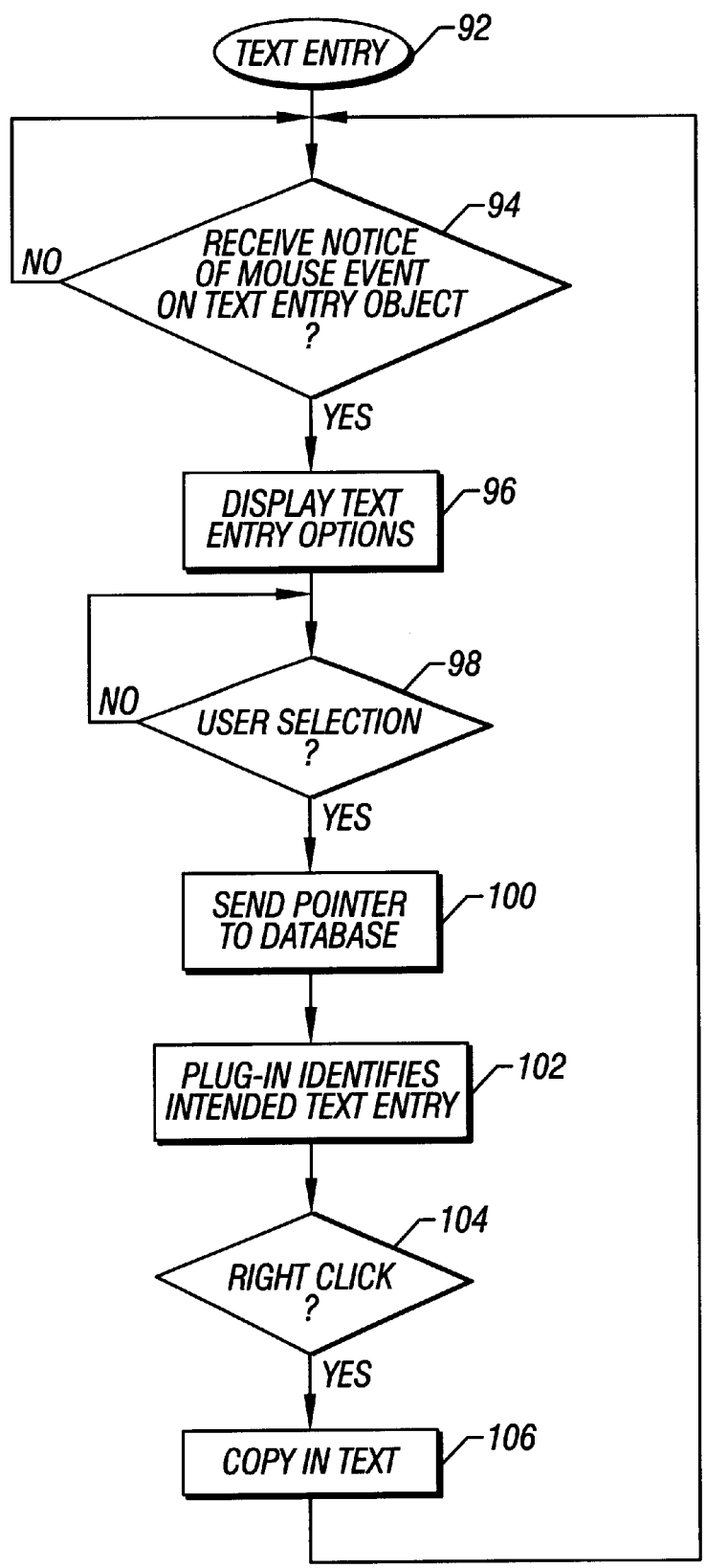
FIG. 8 is a flow chart showing software for implementing one embodiment of the present invention.
Figure 9:
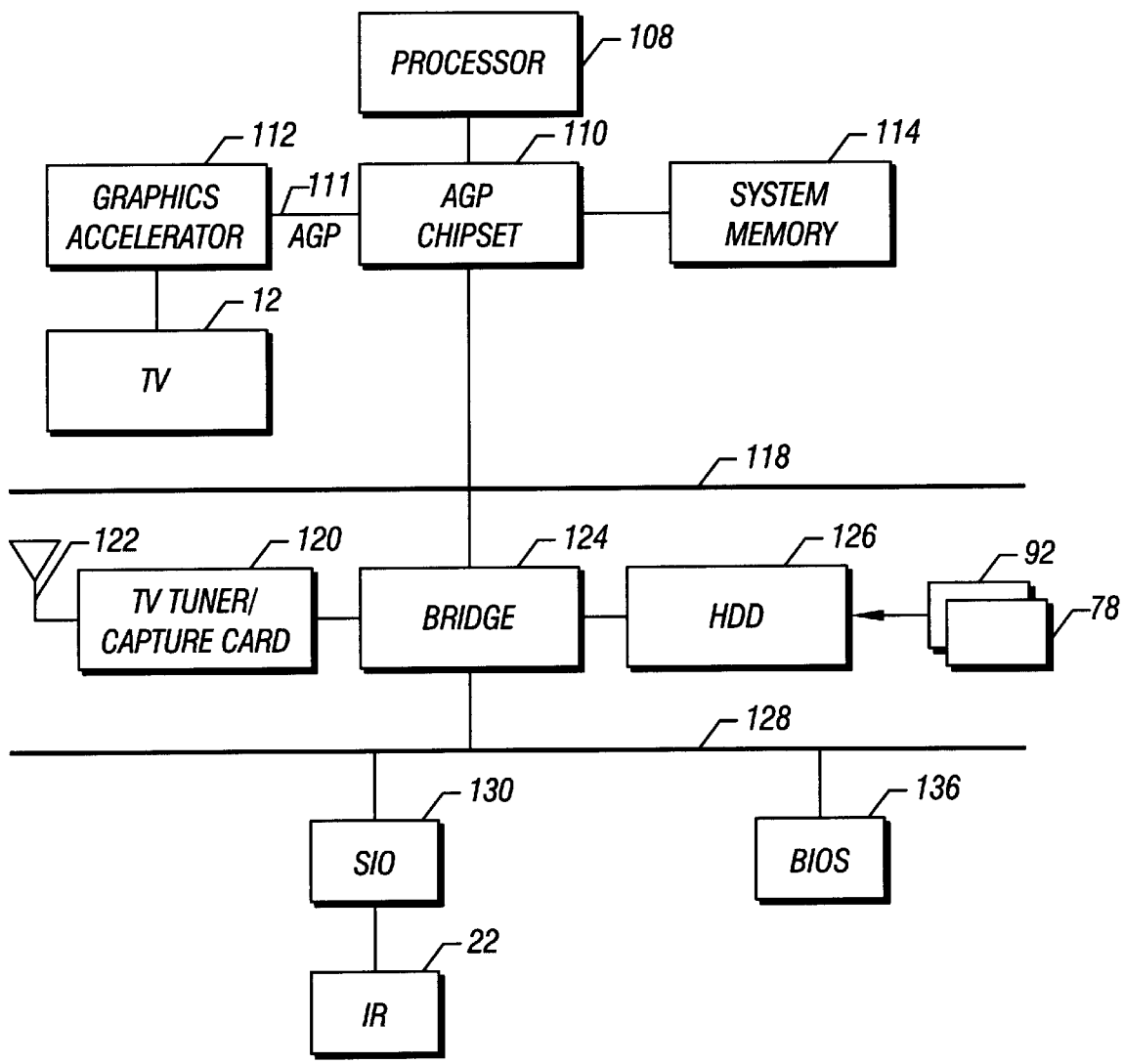
FIG. 9 is a block diagram showing a hardware implementation of one embodiment of the present invention.

Referring next of FIG. 8, software 92 for implementing one embodiment of automated text entry system begins by receiving notice of a mouse event on a text entry object as indicated in diamond 94. A text entry object is basically a field which facilitates text entry. Generally, such fields may be displayed in web pages and maybe based on hypertext mark up language (HTML). Scripted HTML provides script which facilitates the entry of information into HTML. HTML generally does not have the capability to adaptively accept such text information. Thus, the text entry object corresponds to the script associated with a fill in the blank type graphical user interface (such as the interface 73 in FIG. 5) on a web page.

If a mouse event has been received from the operating system, the text entry options may be displayed as indicated in block 96. The text entry options may include the graphical user interfaces 36, 52 and 72 using the example of FIG. 5.

At diamond 98 a check determines whether the user has selected any of the icons in the text entry option graphical user interface. If so, as indicated at block 100, the code for the necessary pointer to retrieve the information from the database 78 may be acquired as illustrated in connection with FIG. 7.

Next the plug-in identifies the intended text entry (block 102). When a mouse click is detected (diamond 104) the code for the text is posted to the data entry file associated with the web page (diamond 106).

Turning next to FIG. 91, a hardware implementation for the embodiment shown in FIG. 1 includes a processor 108. In one embodiment, the processor may be coupled to an accelerated graphics port (AGP) (See Accelerated Graphics Port Interface Specification, Revision 1.0, published on Jul. 31, 1996 by Intel Corporation, Santa Clara, Calif.) chipset 110 for implementing an accelerated graphics port embodiment. The chipset 110 communicates with the AGP port 111 and the graphics accelerator 112. The television 12 may be coupled to the video output of the graphics accelerator 112. The chipset 112 accommodates the system memory 114.

The chipset 110 is also coupled to a bus 118. The bus 118 couples a TV tuner/capture card 120 which is coupled to an antenna 122 or other video input port, such as a cable input port, a satellite receiver/antenna or the like. The TV tuner/capture card 120 selects a desired television channel and also performs the video capture function. One exemplary video capture card is the ISVR-III video capture card available from Intel Corporation.

The bus 118 is also coupled to a bridge 124 which may couple a storage device such as a hard disk drive 126 or a FLASH memory. The software 92 and the database 78 may be stored on the hard disk drive 126. The bridge 124 is also coupled to another bus 128. The bus 128 may be coupled to a serial input/output (SIO) device 130. The device 130 is in turn coupled to the infrared interface 22. Also connected to the bus 128 is a basic input/output system (BIOS) 136.

Thus, the present invention enables automated text entry without requiring typing or even use of a keyboard. By pre-typing the information into a graphical user interface and storing that information, code for the information may be repeatedly accessed and entered into text entry fields without re-typing the information. Thus, simple mouse click operations may be utilized to repetitively transfer information into text entry fields, particularly in connection with Internet web pages. This facilitates the operation of any processor-based system and is particularly useful in connection with those systems which have reduced keyboard capabilities.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   identifying a mouse event;
   determining whether said mouse event is associated with a text entry field;
   upon selection of the text entry field and prior to the user inputting text into said text entry field, displaying a plurality of mouse selectable text entry options, each of said options being predefined based on a characteristic of said text entry field; and
   upon selection of one of said text entry options, copying code corresponding to a selected option into said text entry field.

2. The method of claim 1 wherein displaying a plurality of text entry options includes displaying said text entry options as a graphical user interface.

3. The method of claim 1 wherein copying code corresponding to a selected option includes receiving a mouse selection from the user, correlating the mouse selection to a stored text locator and using the locator to access previously stored text for entry into a text entry field.

4. The method of claim 3 further including receiving a user selection in the form of a mouse event.

5. The method of claim 1 further including using an Internet browser to enable automated text entry.

6. The method of claim 1 wherein determining whether the mouse event is associated with a text entry field includes determining whether the user is operating a mouse to select an icon in proximity to a text entry field.

7. The method of claim 1 wherein copying code includes accessing a user programmed database containing defined code for entry into text entry fields.

8. The method of claim 1 further including accessing a pointer to a database entry corresponding to an item selected by a user on a graphical user interface.

9. An article comprising a medium for storing instructions that, if executed, enable a processor-based system to:
   identify a mouse event;
   determine whether said mouse event is associated with a text entry field;
   upon selection of a text entry field and prior to the user entry of data into said text entry field, display a plurality of mouse selectable text entry options, said options being predefined based on a characteristic of said text entry field; and
   upon selection of a text entry option, copy code corresponding to the selected option into said text entry field.

10. The article of claim 9 further storing instructions that cause a processor-based system to display said text entry options as a graphical user interface.

11. The article of claim 9 further storing instructions that cause a processor-based system to receive a mouse selection from the user, correlate the mouse selection to a stored text locator, and use the locator to access previously stored text for entry into a text entry field.

12. The article of claim 11 further storing instructions that cause a processor-based system to receive a user selection in the form of a mouse event.

13. The article of claim 9 further storing instructions that cause a processor-based system to use an Internet browser to enable automated text entry.

14. The article of claim 9 further storing instructions that cause a processor-based system to determine whether the user is operating a mouse to select a highlighted icon in proximity to a text entry field.

15. The article of claim 9 further storing instructions that cause a processor-based system to access a user programmed database containing defined code for entry into text entry fields.

16. The article of claim 9 further storing instructions that cause a processor-based system to access a pointer to a database entry corresponding to an item selected by a user on a graphical user interface.

17. A processor-based system comprising:
   a processor;
   a memory coupled to said processor;
   a mouse to provide mouse inputs to said processor; and
   said memory storing software that enables predefined textual information stored in a database to automatically be inserted into a text entry field in a graphical user interface in response to a mouse input command prior to entry by the user of text into said text entry field.

19. The system of claim 17 wherein said mouse device is a remote control unit.

18. The system of claim 17 wherein said system is a set top computer.

20. The system of claim 17 wherein said remote control unit is infrared based.

\* \* \* \* \*